(12) United States Patent
Pettitt et al.

(10) Patent No.: US 9,195,123 B2
(45) Date of Patent: Nov. 24, 2015

(54) PROJECTOR LIGHT SOURCE AND SYSTEM, INCLUDING CONFIGURATION FOR DISPLAY OF 3D IMAGES

(71) Applicant: TEXAS INSTRUMENTS INCORPORATED, Dallas, TX (US)

(72) Inventors: Gregory S. Pettitt, Farmersville, TX (US); John M. Ferri, Allen, TX (US)

(73) Assignee: TEXAS INSTRUMENTS CORPORATED, Dallas, TX (US)

( * ) Notice: Subject to any disclaimer, the term of this patent is extended or adjusted under 35 U.S.C. 154(b) by 355 days.

(21) Appl. No.: 13/652,129

(22) Filed: Oct. 15, 2012

(65) Prior Publication Data

US 2013/0242534 A1    Sep. 19, 2013

Related U.S. Application Data

(60) Provisional application No. 61/546,915, filed on Oct. 13, 2011.

(51) Int. Cl.

| | |
|---|---|
| *F21V 9/16* | (2006.01) |
| *G03B 21/26* | (2006.01) |
| *G03B 21/28* | (2006.01) |
| *G03B 21/20* | (2006.01) |
| *F21V 9/08* | (2006.01) |
| *G03B 35/16* | (2006.01) |
| *H04N 9/31* | (2006.01) |
| *H04N 13/04* | (2006.01) |

(52) U.S. Cl.
CPC .............. *G03B 21/204* (2013.01); *F21V 9/08* (2013.01); *G03B 35/16* (2013.01); *H04N 9/3111* (2013.01); *H04N 9/3158* (2013.01); *H04N 9/3161* (2013.01); *H04N 9/3164* (2013.01); *H04N 13/0431* (2013.01); *H04N 13/0434* (2013.01); *H04N 13/0459* (2013.01)

(58) Field of Classification Search
CPC ........... G02B 6/29361; G02B 6/29365; G02B 27/141; G02B 27/149; G02B 2027/0114; G02B 17/006; G02B 26/0816
USPC ......................................... 362/84; 353/98, 34
See application file for complete search history.

(56) References Cited

U.S. PATENT DOCUMENTS

| | | | |
|---|---|---|---|
| 6,283,597 B1 | 9/2001 | Jorke | |
| 7,070,300 B2 | 7/2006 | Harbers et al. | |
| 7,547,114 B2 | 6/2009 | Li et al. | |
| 7,845,802 B2 * | 12/2010 | Ikeda et al. | ...................... 353/31 |
| 8,662,673 B2 * | 3/2014 | Miyazaki | ........................ 353/31 |
| 2006/0285217 A1* | 12/2006 | Roth | .............................. 359/634 |

(Continued)

*Primary Examiner* — Hargobind S Sawhney
*Assistant Examiner* — William N Harris
(74) *Attorney, Agent, or Firm* — Tuenlap D. Chan; Frank D. Cimino (57) ABSTRACT

An imaging system using a spatial light modulator has first color laser light directed by a dichroic element to a rotating member. The rotating member includes phosphor segments that respond to illumination by the first color light to emit second and third color light along a first path to the dichroic element for output, and a light transmitting segment that passes the first color through the rotating member along a second path to the dichroic element for output. In a 3D imaging mode, the first color laser light includes light of two wavelengths, and the phosphor segments include segments that emit second and third color light each of two wavelengths. The output light is directed to a second rotating member that selectively transmit one wavelength of each color while blocking the other wavelength of each color.

10 Claims, 14 Drawing Sheets

(56) References Cited

U.S. PATENT DOCUMENTS

| | | |
|---|---|---|
| 2007/0019408 A1 | 1/2007 | McGuire, Jr. et al. |
| 2009/0262308 A1 | 10/2009 | Ogawa |
| 2009/0284148 A1* | 11/2009 | Iwanaga ................ 313/506 |
| 2010/0066813 A1 | 3/2010 | Jorke |
| 2010/0328626 A1 | 12/2010 | Miyazaki |
| 2010/0328628 A1* | 12/2010 | Masuda ................ 353/85 |
| 2010/0328632 A1* | 12/2010 | Kurosaki et al. ........... 353/98 |

* cited by examiner

WHEEL SEGMENTATION

PHOSPHOR WHEEL

FIG. 11

3D COLOR WHEEL

PROJECTOR LIGHT SOURCE AND SYSTEM, INCLUDING CONFIGURATION FOR DISPLAY OF 3D IMAGES

This application claims the benefit of Provisional Application No. 61/546,915, filed Oct. 13, 2011, the entirety of which is hereby incorporated by reference.

BACKGROUND

This relates to image projection systems and light sources usable with image projection systems.

There is a commercial need to provide a solid-state long lifetime light source that can create and illuminate a spatial light modulator (SLM) with enough lumens to be useful for mainstream data projectors.

There is a commercial need to provide projector systems using such a light source.

SUMMARY

Disclosed is a projector light source and projector system utilizing a hybrid laser and fluorescent emission light source. Also disclosed is an implementation of the light source and system for display of three-dimensional images.

DETAILED DESCRIPTION OF EXAMPLE EMBODIMENTS

Figure 1:
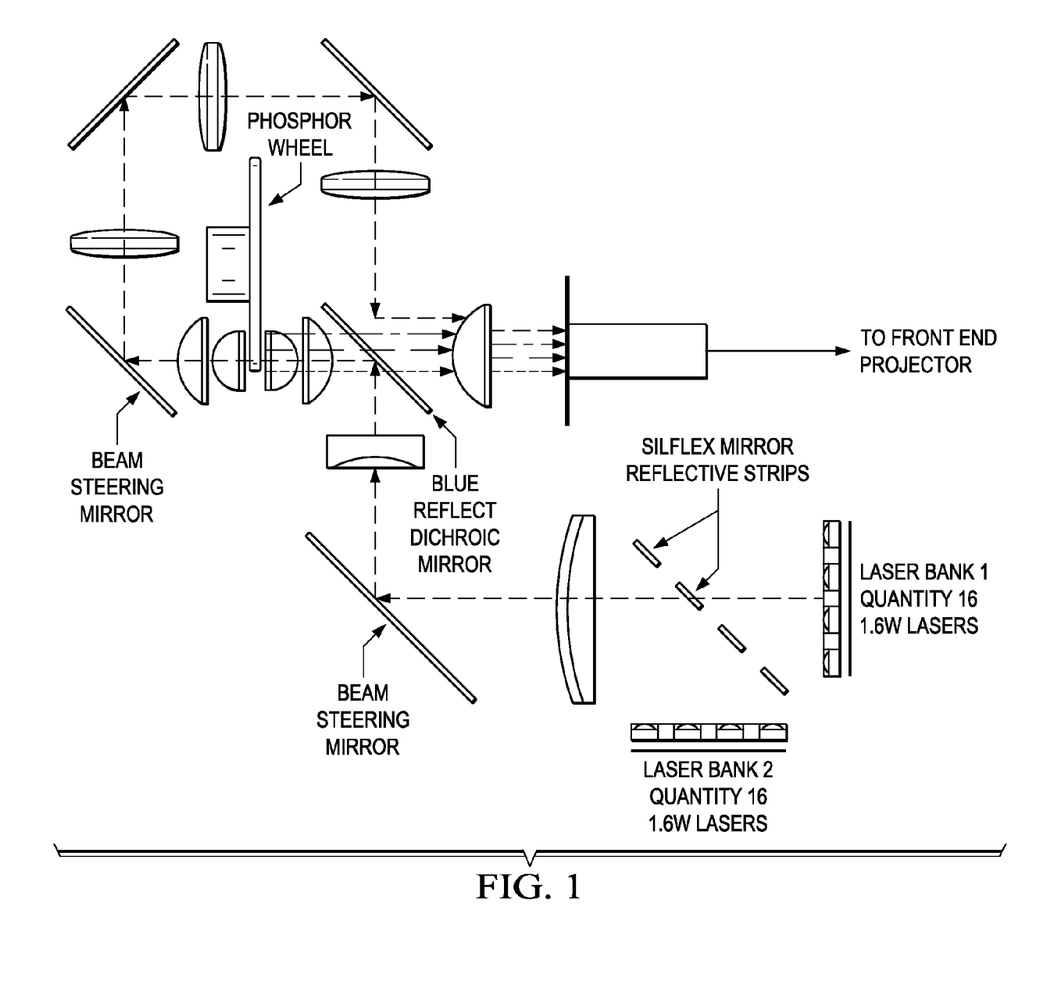
FIG. 1 illustrates an example implementation of a laser pumped phosphor illuminator.

FIG. 1 illustrates an example implementation of a laser pumped phosphor illuminator. The illuminator includes laser banks 1 and 2, each with 16 1.6 W blue lasers, Silflex mirror reflective strips, beam steering mirrors, a blue reflect dichroic mirror, a color wheel, and lenses arranged as shown.

Figure 2:
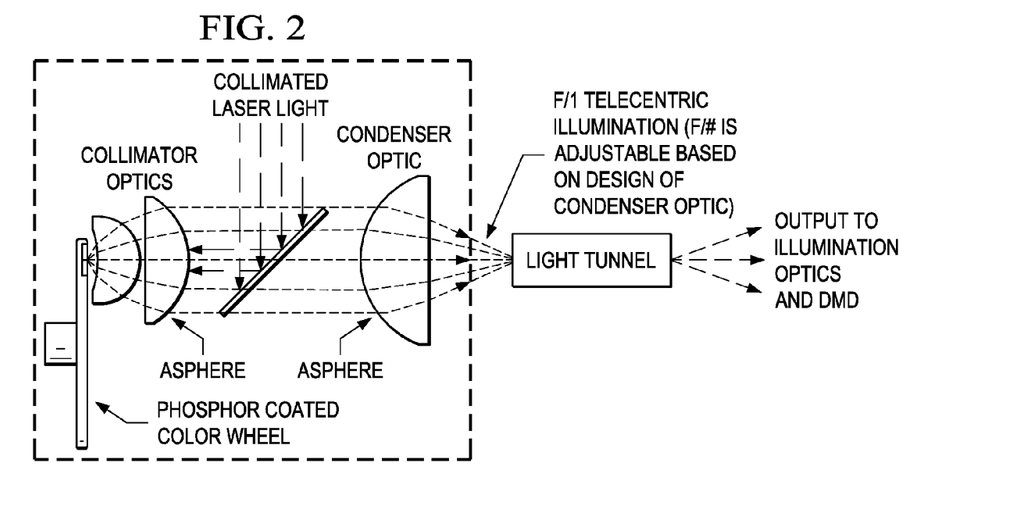
FIG. 2 illustrates the collector optics of the illuminator of FIG. 1.

FIG. 2 illustrates the collector optics of the illuminator of FIG. 1. Collimated blue laser light is injected into the optics, reflected by one side of a blue dichroic mirror and focused by an asphere lens onto the color wheel which includes angularly spaced different wavelength red, green and yellow (R, G, Y) color emitting phosphor segments and light transmissive segments or openings. Light emissions from the R, G, Y color emitting phosphor segments are collected by a set of collection optics, passed through the blue dichroic mirror, and focused by another asphere lens onto a light tunnel. The phosphor segments may take the form of spots of phosphor powder applied to the wheel. The spots are kept small (~2 mm) for optimal light collection into the tunnel.

Figure 3:
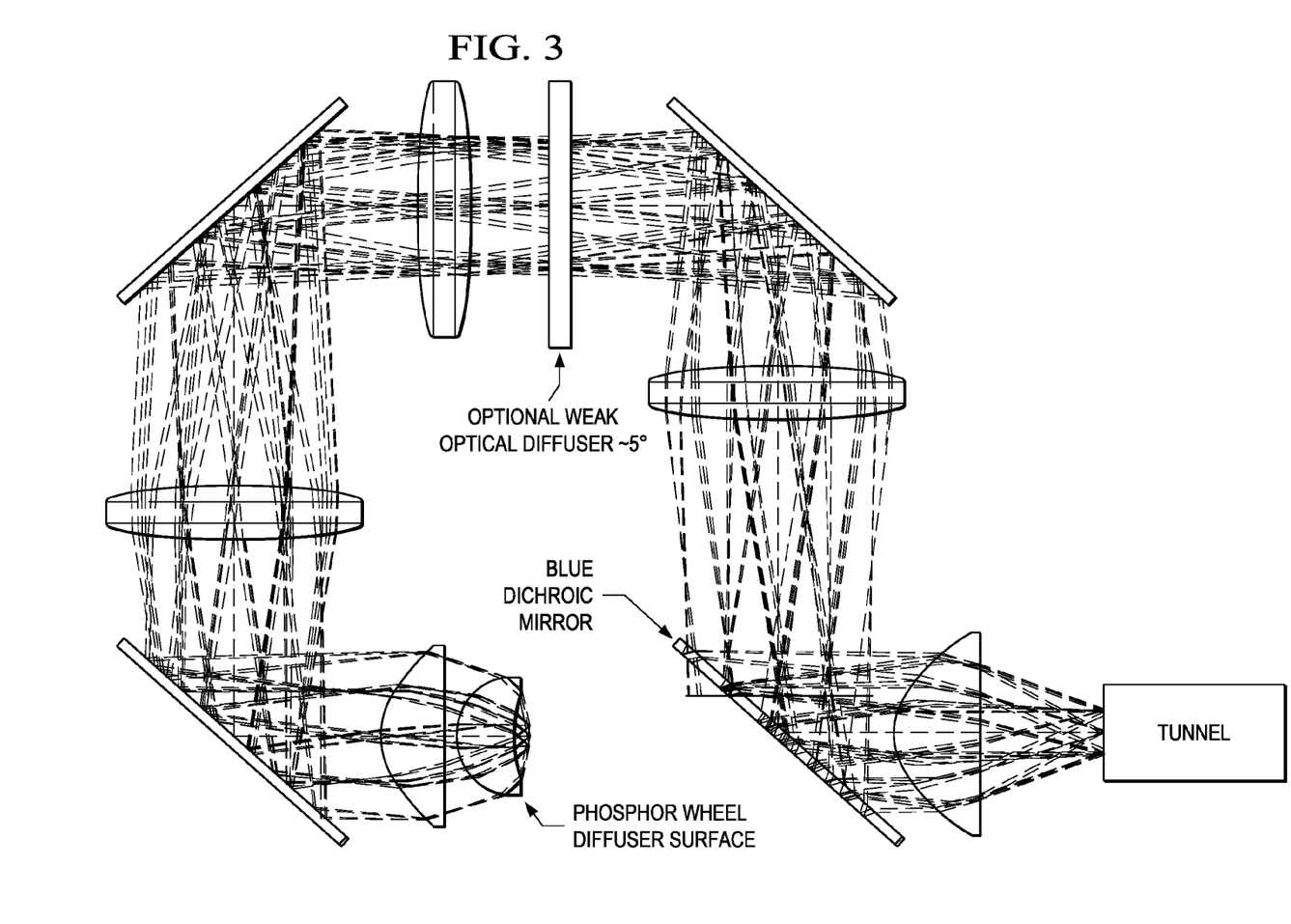
FIG. 3 illustrates the blue relay path.

Blue (B) laser light transmitted through the light transmissive segments or openings is passed though the color wheel and directed via beam steering mirrors and optics to the other side of the blue dichroic mirror, from which it is reflected for focusing using the same other asphere lens onto the light tunnel. (The blue dichroic mirror passes the wavelengths of the red, green and yellow phosphor emissions, but reflects the wavelength of the blue laser light.) In the described example, the blue light relay path uses the direct laser blue light (445 nm or 460 nm) as a blue source. Laser beams are scattered by a diffuse transmissive section of the phosphor wheel and routed around to reflect off the blue dichroic mirror. In the illustrated arrangement, the light path of the transmitted blue light recombines with (i.e., realigns with) the light path of the red, green and yellow light before the condenser lens. The relay optics takes the form of a 1:1 pupil relay and maintains magnification of the system. A static diffuser is an alternative to a wheel diffuser located at or near an intermediate image plane. The blue relay path is illustrated in FIG. 3. A weak optical diffuser may be included in the blue light relay path.

The output from the light tunnel is directed to illumination optics and onto an N×M array of individually addressable light pixel switches of a spatial light modulator, such as an N×M array of micromirrors of a digital micromirror device (DMD) (e.g., a DLP™ device from Texas Instruments). The color wheel rotates in synchronism with operation of the light pixel switches to project the red, green, yellow and blue light for integration into a composite color image on a display surface.

Figure 4:
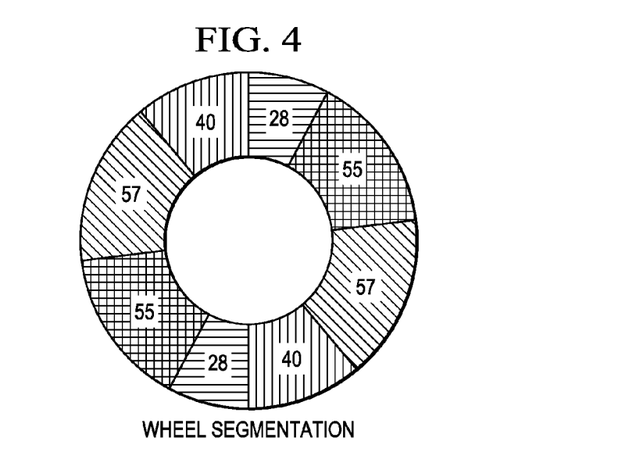
FIGS. 4-6 illustrate an example wheel segmentation and related characteristics for the R, G, Y and B segments of the color wheel.
Figure 5:
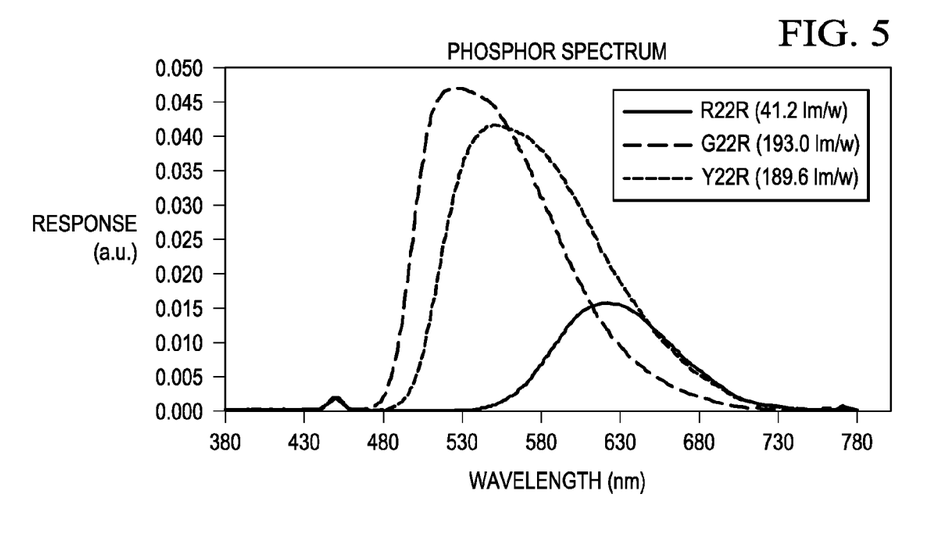
Figure 6:
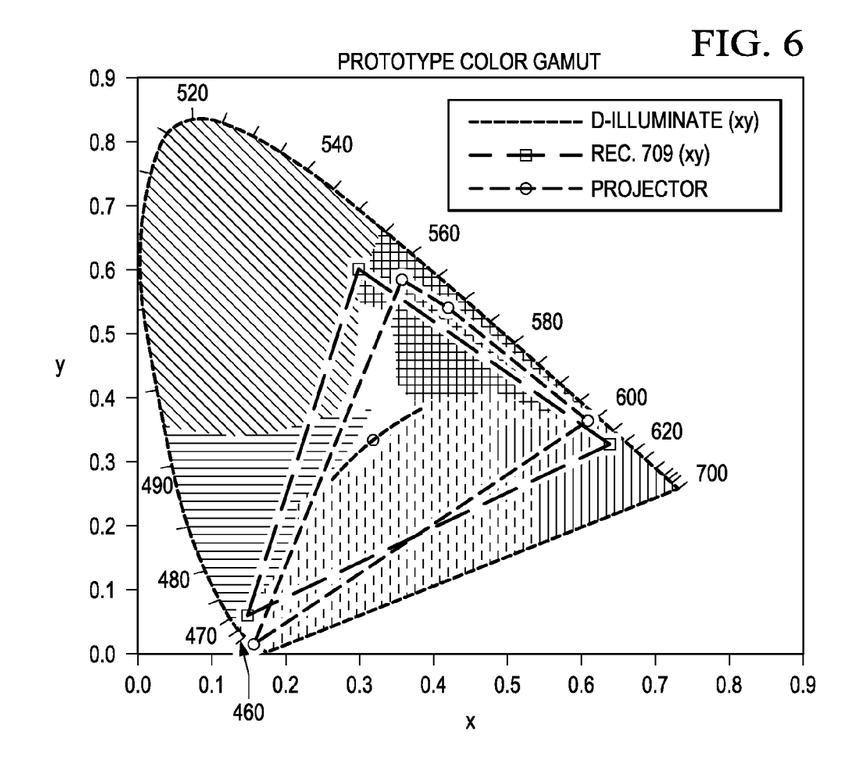

FIGS. 4-6 illustrate an example wheel segmentation and related characteristics for the R, G, Y and B segments of the color wheel. As shown in FIG. 4, a circumferential serial arrangement of segments may be a twice repeated same sequence of 55° Y (yellow segment 55), 57° G (green segment 57), 40° R (red segment 40), and 28° B (blue segment 28). An example wavelength spectrum selection for selection of phosphors is shown in FIG. 5 wherein G (tallest curve with leftmost peak) has a response of 0.045-0.05 a.u. at a wavelength of 480-530 nm, Y (next tallest curve with middle peak) has a response of 0.04-0.045 a.u. at a wavelength of 530-580 nm, and R (shortest curve with rightmost peak) has a response of about 0.015 a.u. at a wavelength of around 630 nm. FIG. 6 shows an example color gamut. Use of yellow as a fourth color enables a good balance between the large amount of blue available in the system, and helps provide a good white point. The time sequential nature of imaging using segments of a rotating color wheel allows for phosphor spectral overlap (i.e., can use yellow). The algorithm used for imaging may be the same as used in the BrilliantColor™ system.

Figure 7:
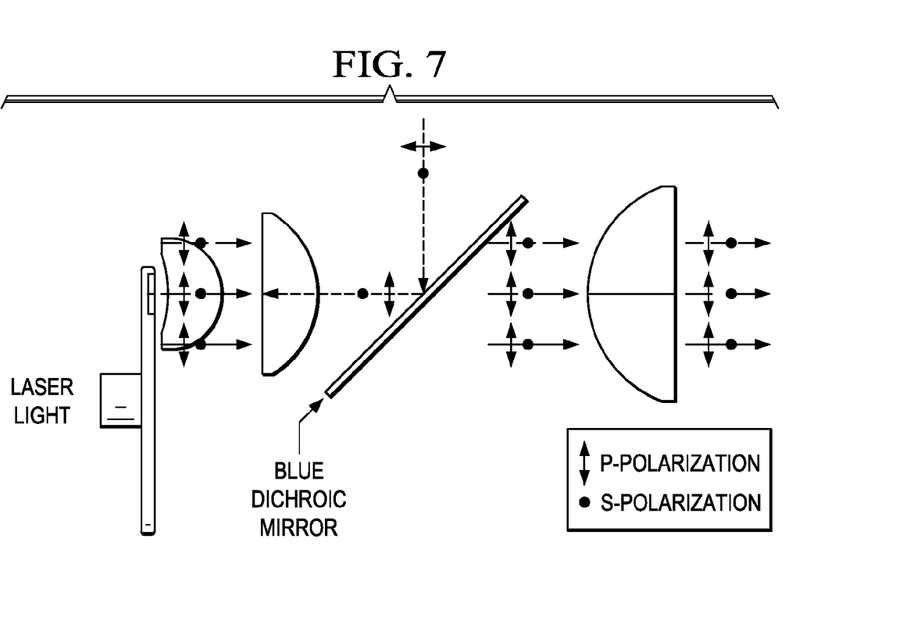
FIGS. 7-8 give arrangement and characteristics of the dichroic mirror.
Figure 8:
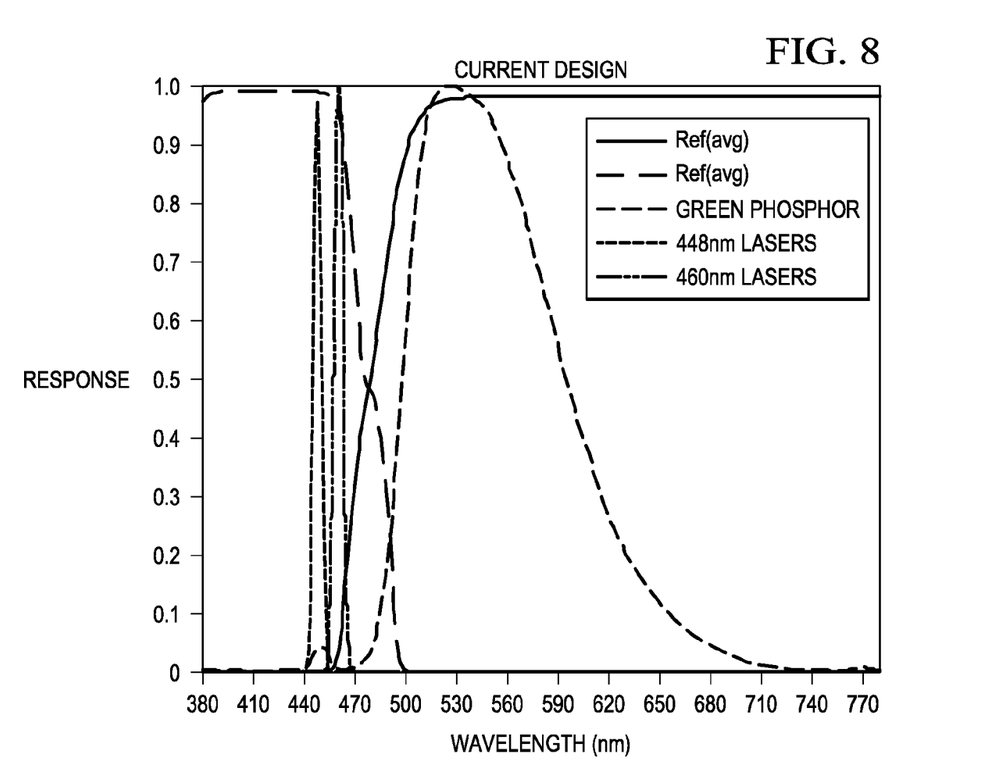

The dichroic mirror, shown schematically in FIG. 7 (blue shown going down and to the left; green on top, yellow in the middle, and red on the bottom shown going to the right in three places), is configured for reflecting the blue laser light, but for transmitting the green, yellow and red phosphor wavelengths. The design of the mirror is preferably chosen to give filter cutoffs, shown by the example curves in FIG. 8, which will maximize laser throughput assuming random polarization state of the laser and phosphor emissions. The illustrated design (see FIG. 8) has response characteristics chosen for use with 445 nm laser input light.

The illustrated light source arrangement may be implemented without additional electronics drivers or cooling elements needed for LED sources. Although other arrangements may be used, the illustrated example uses a single dichroic fold mirror for filtering phosphors, directing laser light to phosphors and recombining blue laser light with the phosphor emitted RGY light. The use of laser light and phosphor emissions as described enables the creation of a brighter light source (more lumens) in a small etendue than when LED sources are used. Brightness may be increased by increasing the amount of laser power that is incident on the phosphor surface before thermal quenching occurs. The color wheel (i.e., phosphor wheel) may be implemented using a reflective metal substrate surface to minimize thermal quenching by removing heat from the phosphor. The use of inherent laser polarization relaxes the requirements on the dichroic fold mirror.

The described architecture may be augmented to enable using a spatial light modulator such as a DLP™ digital micromirror device for the projection of images which are viewable in three dimensions (3D) using passive viewing glasses. Unlike 3D imaging approaches that require active glasses, passive viewing glasses do not require power to the eyewear, do not require synchronization of left and right eyewear shutters, and have a lower eyewear cost.

The described light source provides a projector utilizing multiple colors (RGBY), having filtering of phosphor pump light from the individual colors, and providing enough lumens in a small etendue which is suitable for use as a light source for small spatial light modulators.

Figure 9:
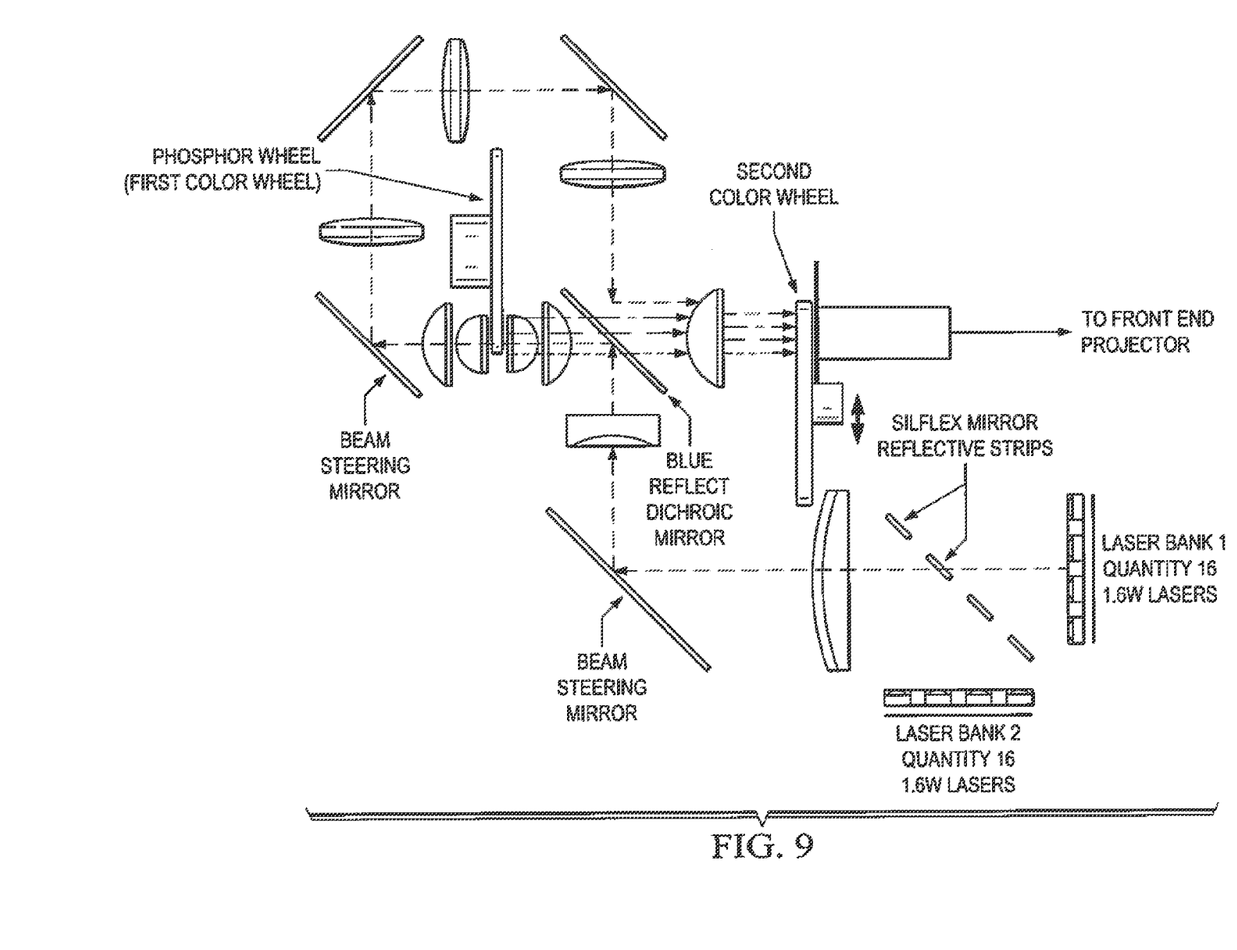
FIG. 9 illustrates the illuminator of FIG. 1, augmented for 3D imaging.

An example augmented architecture of a laser pumped phosphor illuminator usable for 3D imaging is shown in FIG. 9. The general arrangement is similar to that previously described with reference to the arrangement shown in FIG. 1; however, the color wheel and laser light sources are modified to provide two wavelength selectable sources for each R, G, Y and B color and a way for time sequentially alternating between the two sets of colors.

Wavelength selection 3D creates the left and right eye images by providing two of each color displayed. The illustrated architecture utilizes a time sequential wavelength selection process in which two blues, two reds, and two greens are produced, one for each eye. The two blues are provided by utilizing blue light lasers of different wavelengths, one bank of lasers emitting light at 448 nm wavelength and one bank of lasers emitting light at 460 nm wavelength, to provide both the light sources for pumping the phosphor conversion wheel and the two blue colors. The banks are individually electronically controlled to produce the different blue colors, with either or both laser wavelengths usable to illuminate and excite the phosphors.

As shown in FIG. 9, a second wheel may be placed in the optical path just before the integrator rod (light tunnel, above). The wheel includes filters for time sequentially blocking or transmitting a selected one of each of the two wavelengths for each color.

The second color wheel may be arranged for relative movement into or out of the projection optical path, for switching between 3D image and 2D image projection modes.

Figure 10:
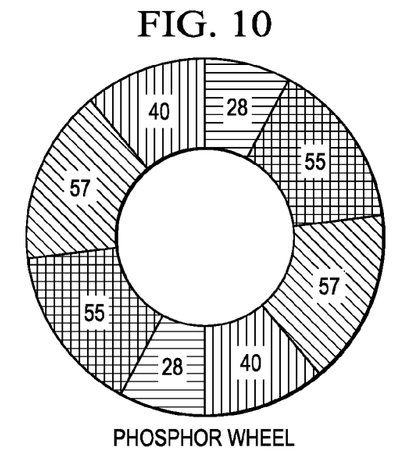
FIGS. 10 and 11 show examples of the phosphor and filter wheels for the system of FIG. 9.
Figure 11:
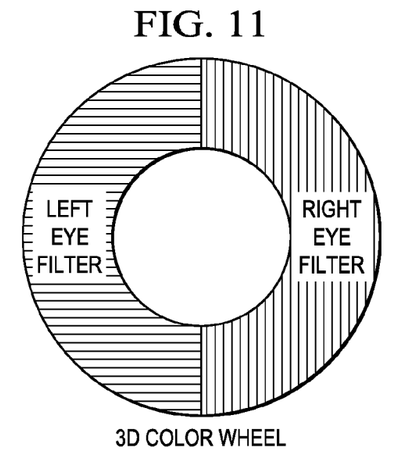

The first and second color wheels for the system of FIG. 9 are shown in FIGS. 10 and 11.

The first wheel (the phosphor conversion wheel) shown in FIG. 10 may have a segmentation arrangement similar to that described previously for the wheel shown and described with reference to FIGS. 4-6. The phosphors and sequences may be as previously described.

The second wheel (wavelength filter wheel) has two sections as shown in FIG. 11: a left eye wavelength filter and a right eye wavelength filter. The second wheel is synchronized with the first wheel, so that B, Y, G and R light of a first wavelength (or first set of wavelengths) for each color is passed by the filter in synchronism with the modulation of the spatial light modulator pixel switches for the left eye image and B, Y, G and R light of a second wavelength (or second set of wavelengths) for each color is passed in synchronism with the modulation of the spatial light modulator pixel switches for the right eye image. (The glasses have left and right lenses with corresponding left and right image wavelength filtering.) The output may, for example, be a 120 Hz left/right cadence of 3D image frames.

The phosphors provide a large wavelength response which is useful in the wavelength selection process. The blue wavelengths may be coordinated so that only one wavelength laser emits light at a time (synchronized with the left/right filtering), or both wavelengths may be emitted with the second (filter) wheel serving to pass only the blue wavelength corresponding to the currently images left or right eye modulation.

FIGS. 12-20 give example parameters for the phosphors and filters used in the first and second wheels and corresponding left and right lenses of the glasses.

Figure 12:
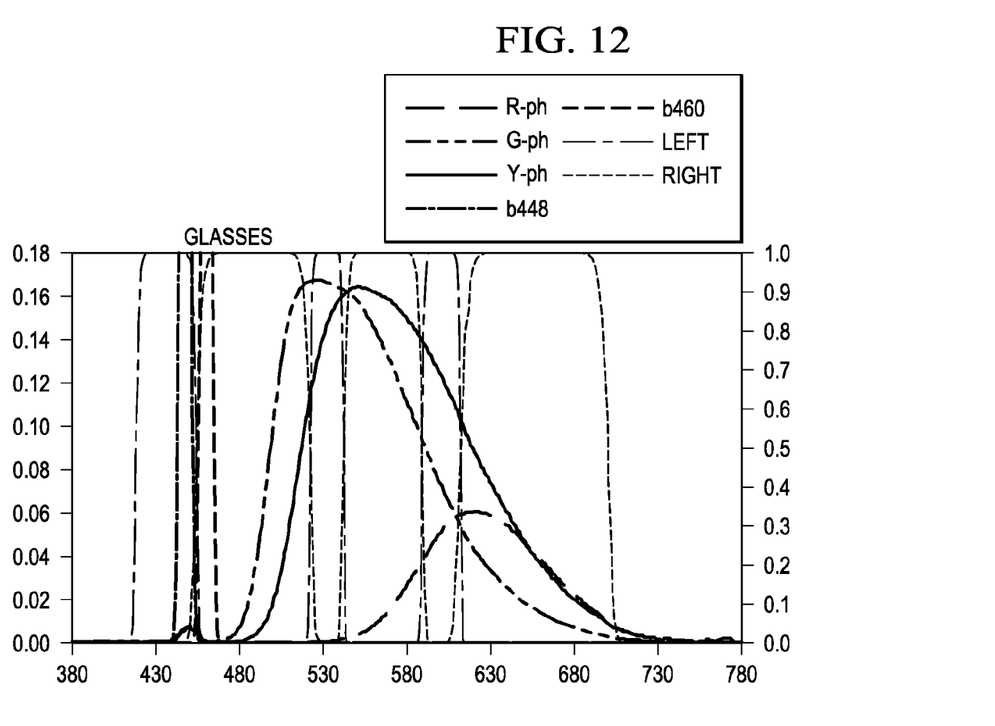
FIGS. 12-20 give example parameters for the phosphors and filters used in the first and second wheels and corresponding left and right lenses of the glasses.

FIG. 12 shows the spectral energy of the phosphors and lasers with the filters overlaid.

Figure 13:
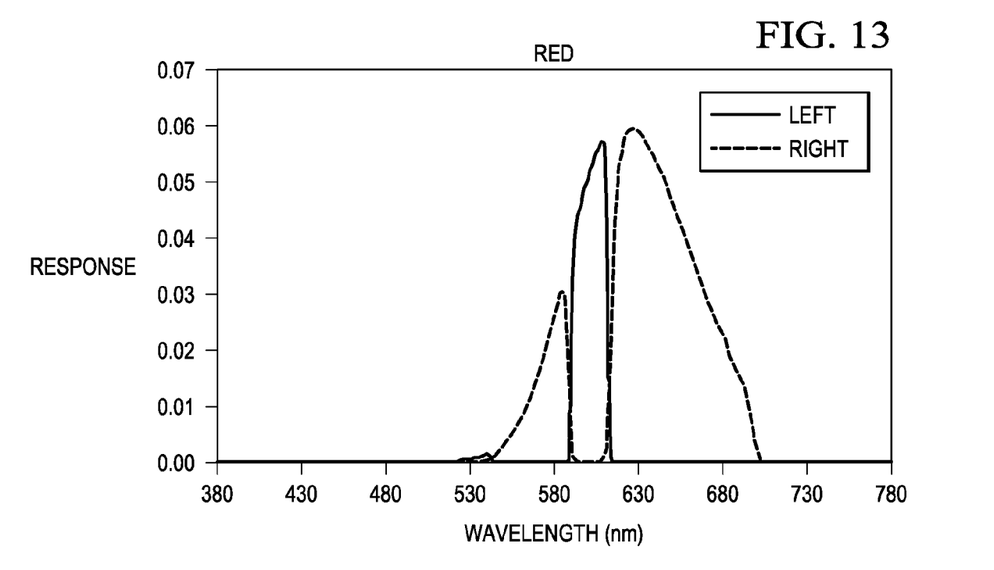
Figure 14:
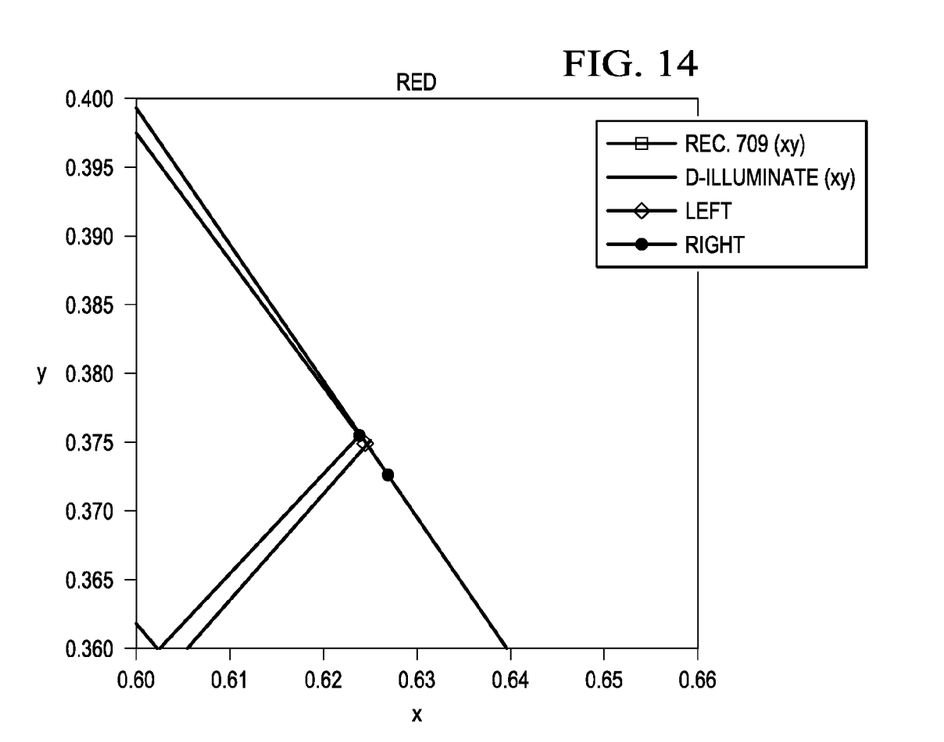
Figure 15:
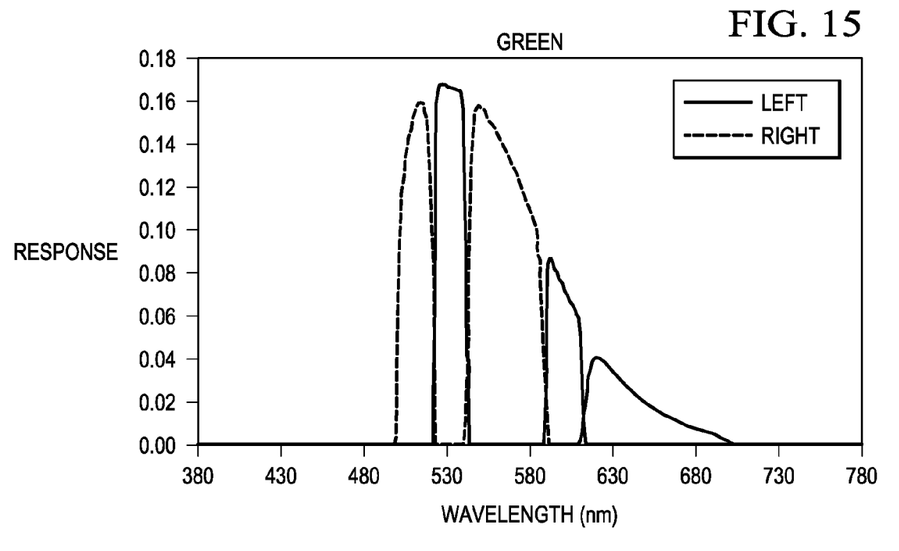
Figure 16:
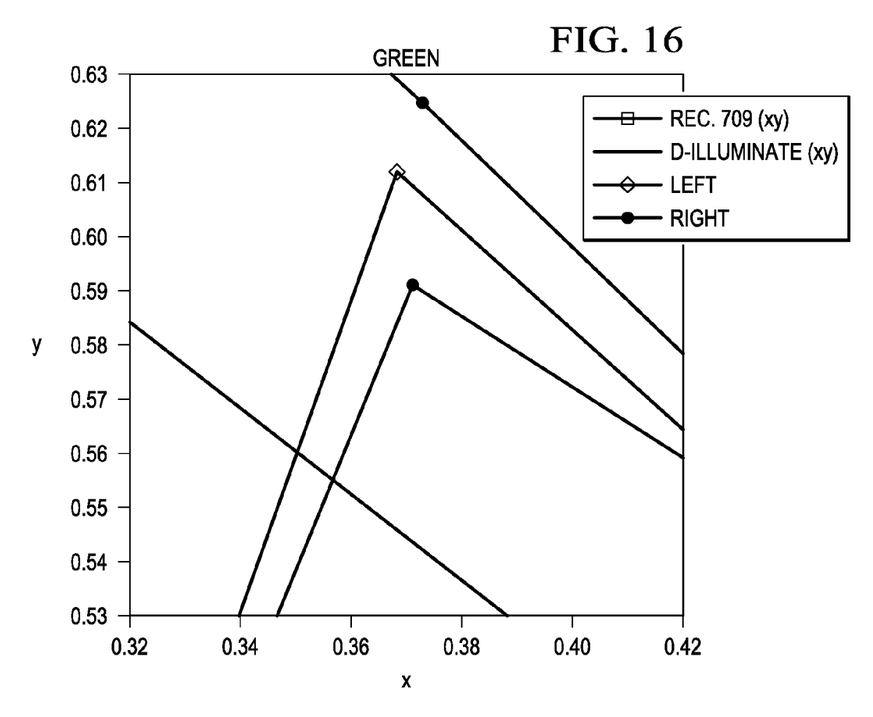
Figure 17:
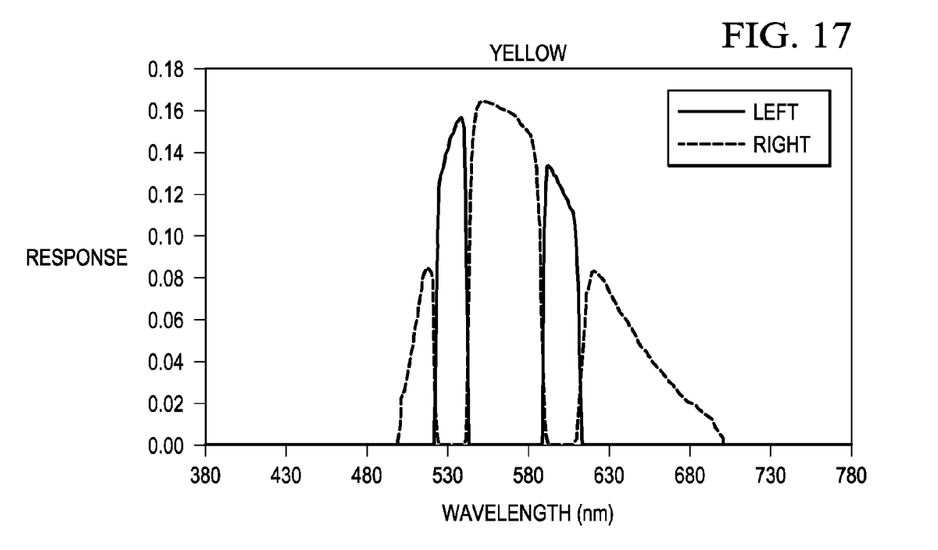
Figure 18:
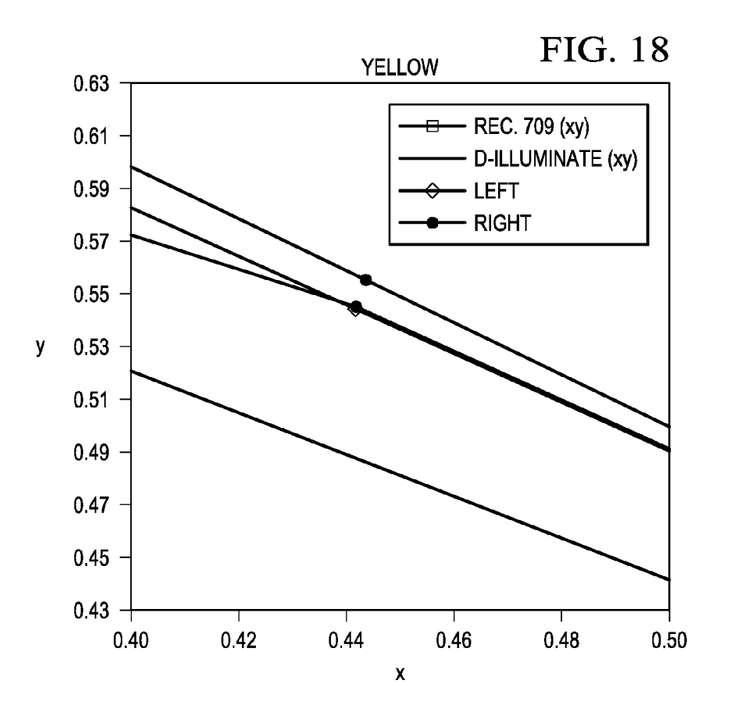
Figure 19:
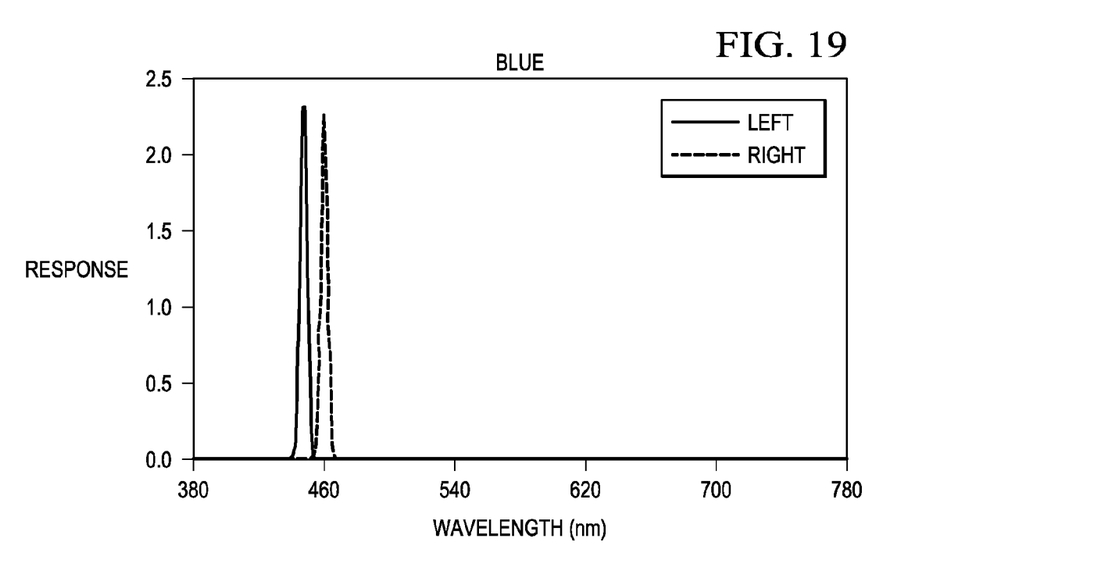
Figure 20:
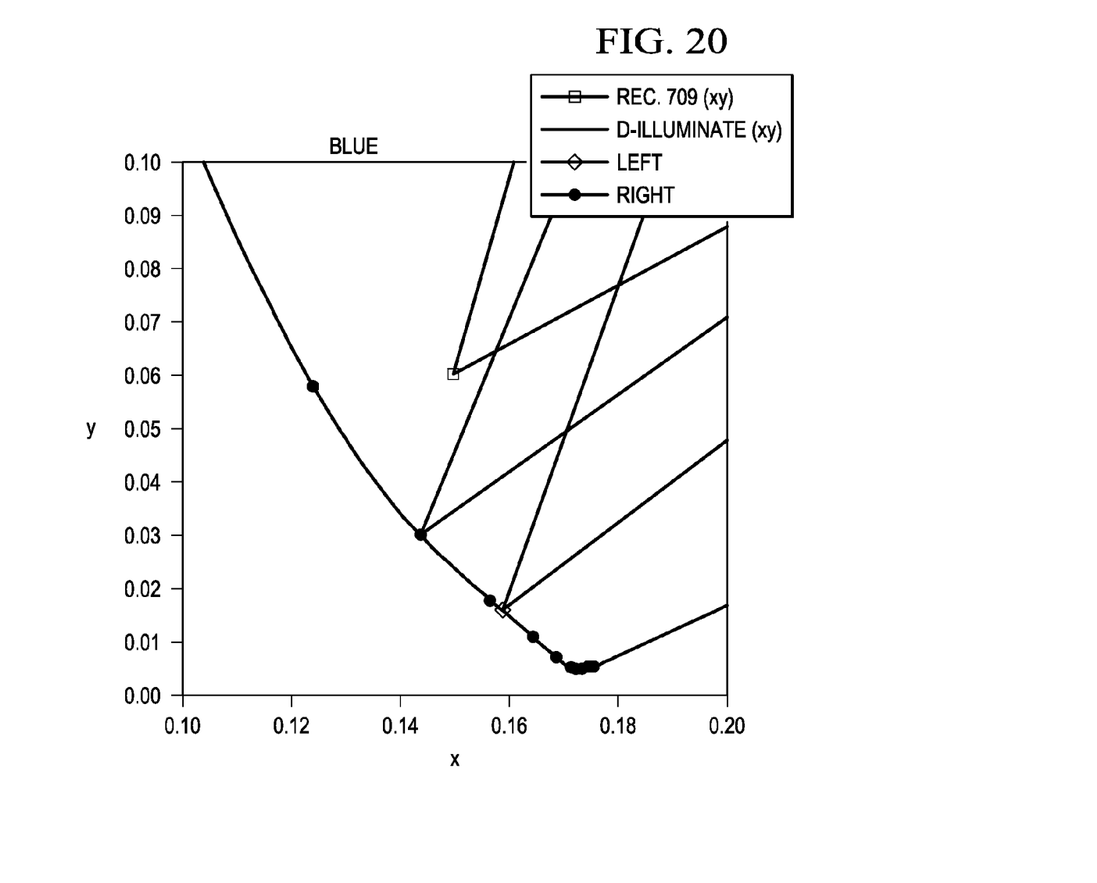

FIGS. 13 and 14 show the two reds created by the filter wheel. FIGS. 15 and 16 show the two greens created by the filter wheel. FIGS. 17 and 18 show the two yellows created by the filter wheel. The BrilliantColor™ algorithms recapture the yellows and spokes. FIGS. 19 and 20 show the two blues created by electronically selecting between the 448 nm and 460 nm lasers. In this implementation, when the blue color imaging for left or right eye occurs only the bank of lasers corresponding to one wavelength is illuminated (although both banks can be illuminated for the pumping of the other color generating phosphors), and only the filters in the glasses discriminate between the two blues. (In other implementations, both laser wavelengths can be turned on when either blue is being images, with the filter wheel used for the discrimination of which wavelength is used for illuminating the display surface.)

Figure 21:
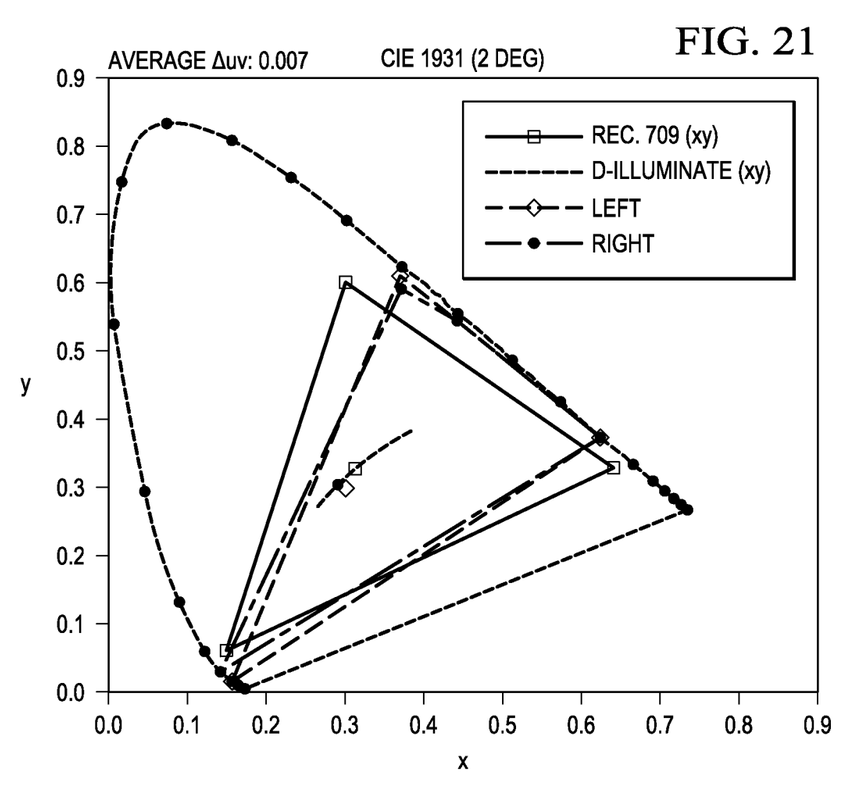
FIGS. 21-21 illustrate example color performances.
Figure 22:
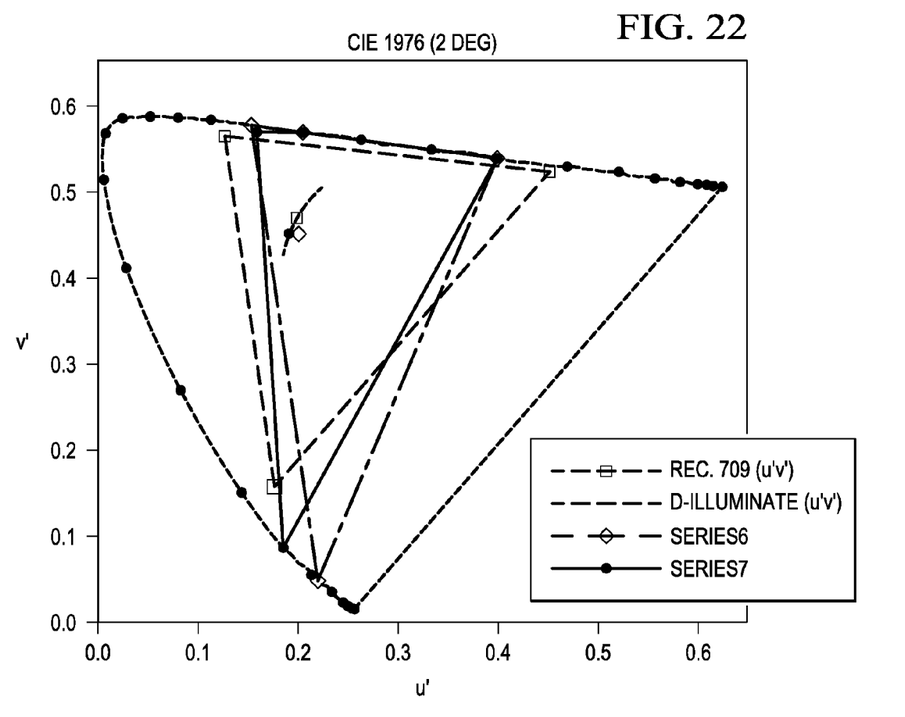

FIGS. 21-22 illustrate example color performances.

Figure 23:
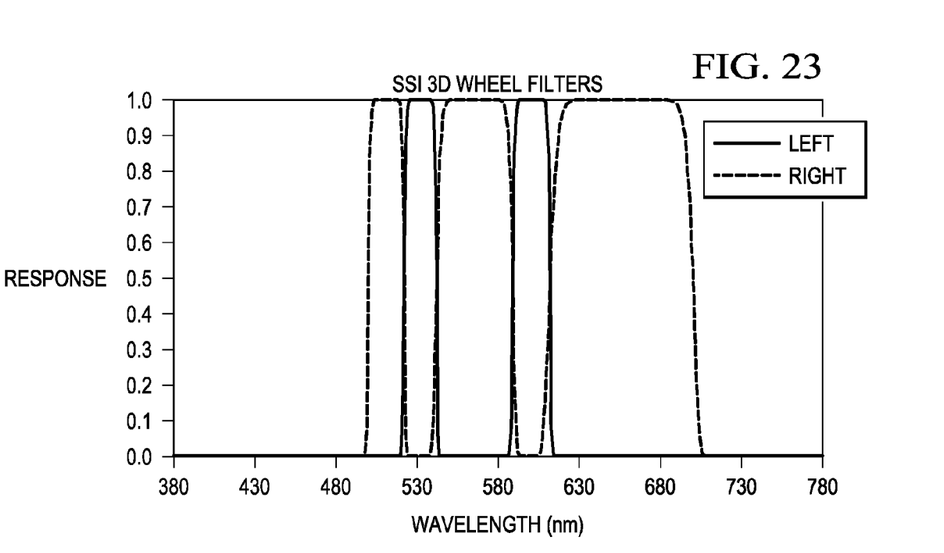
FIG. 23 illustrates example characteristics of the filters for the right and left eye filters of the filter wheel.

FIG. 23 illustrates example characteristics of the filters for the right and left eye filters of the filter wheel.

Figure 24:
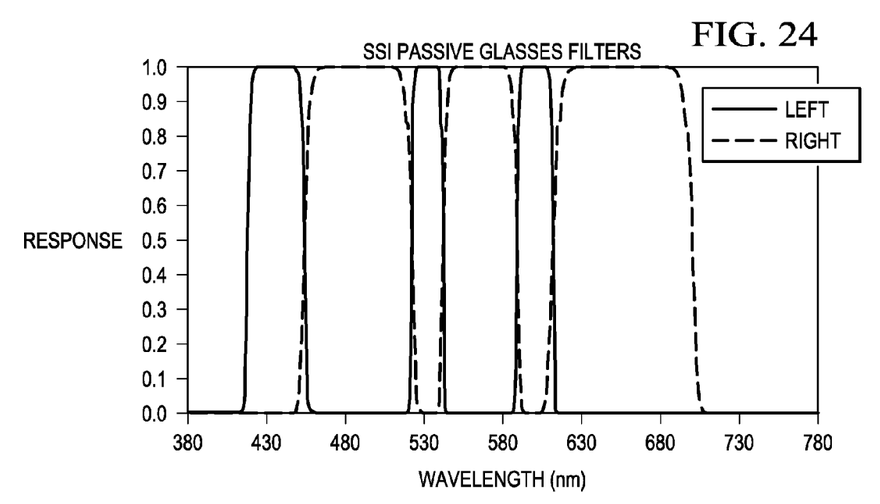
FIG. 24 illustrates example characteristics for the filters for the right and left eye lenses of the passive glasses. The glasses have the same filter cutoffs as the filters of the filter wheel, with the addition of a filter band to separate the two laser bands, 445 nm and 460 nm.

FIG. 24 illustrates example characteristics for the filters for the right and left eye lenses of the passive glasses. The glasses have the same filter cutoffs as the filters of the filter wheel, with the addition of a filter band to separate the two laser bands, 445 nm and 460 nm.

Figure 25:
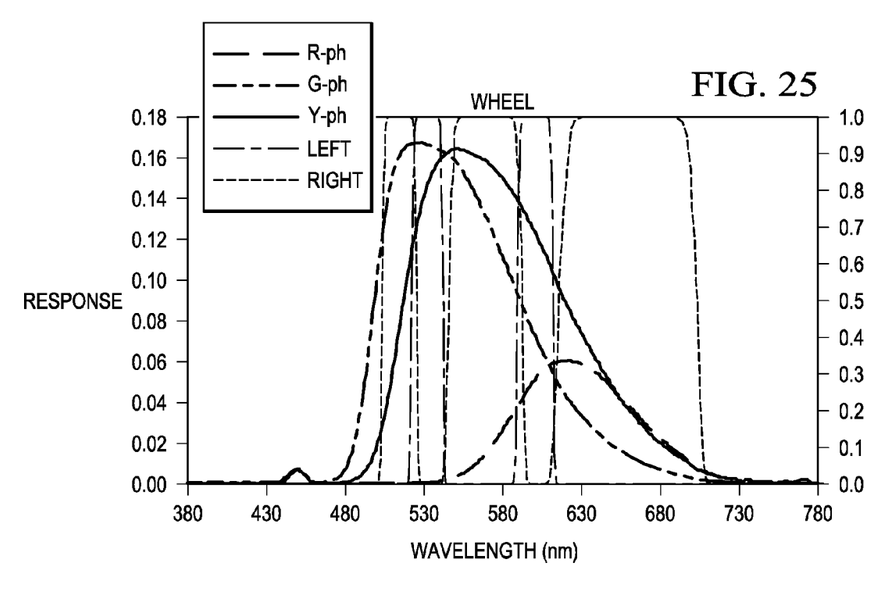
FIG. 25 illustrates the spectral energy from the phosphor wheel and the filter wheel filters overlaid.

FIG. 25 illustrates the spectral energy from the phosphor wheel and the filter wheel filters overlaid.

The DDP4421 has dual PCC color correction registers that enable individual left/right eye color correction. This allows for white point and individual color matching for the individual left and right eyes. Brightness matching can be accomplished either using laser current or PCC color control With the advancement of phosphor technology, such as advancements in quantum dot phosphors, instead of using a filter wheel and repeating the sequence of phosphors for yellow, red and green, the filter wheel may be omitted with phosphors of different yellow, red and green light emission characteristics used for the repetition of the colors.

Those skilled in the art to which the invention relates will appreciate that other modifications may be made to the described embodiments, and yet further embodiments realized, within the scope of the invention to be claimed.

The invention claimed is:

1. An image projection system, comprising:
   a source emitting laser light having a first and second wavelengths;
   a first rotable member including:
      a first phosphor segment configured to emit light of a selected color within a first selected wavelength range upon receiving the laser light having the first wavelength;
      a second phosphor segment configured to emit light of the selected color within a second selected wavelength range upon receiving the laser light having the second wavelength;
      a first light transmissive segment configured to transmit the laser light having the first wavelength; and
      a second light transmissive segment configured to transmit the laser light having the second wavelength;
   a light directing optics positioned to direct laser light having the first and second wavelengths transmitted by the first rotable member back to a location from which the first rotable member receives the laser light;
   a dichroic optical element placed at the location, the dichroic optical element positioned and configured to:
      direct the laser light having the first and second wavelengths from the source to the first rotable member;
      transmit the emitted light having the selected color within the first and second selected wavelength ranges from the first rotable member to a light output optics; and
      direct the laser light of the first and second wavelengths from the light directing optics to the light output optics; and
   a second rotable member positioned between the dichroic optical element and the light output optics, the second rotable member including:
      a first light selection segment configured to, during a first time period, pass the emitted light of the selected color within the first selected wavelength range and simultaneously block the emitted light of the selected color within the second selected wavelength range; and
      a second light selection segment configured to, during a second time period non-overlapping with the first time period, pass the emitted light of the selected color within the second selected wavelength range and simultaneously block the emitted light of the selected color within the first selected wavelength range.

2. The image projection system of claim 1, wherein:
   the first light selection segment is configured to, during the first time period, pass the laser light having the first wavelength and simultaneously block the laser light having the second wavelength; and
   the second light selection segment is configured to, during the second time period, pass the laser light having the second wavelength and simultaneously block the laser light having the first wavelength.

3. The image projection system of claim 1, wherein:
   the laser light having the first wavelength includes blue laser light having the first wavelength; and
   the laser light having the second wavelength includes blue laser light having the second wavelength.

4. The image projection system of claim 1, wherein the first phosphor segment includes:
   a red phosphor segment configured to emit light of a red color wavelength within the first selected wavelength range;
   a yellow phosphor segment configured to emit light of a yellow color wavelength within the first selected wavelength range; and
   a green phosphor segment configured to emit light of a green color wavelength within the first selected wavelength range.

5. The image projection system of claim 4, wherein the second phosphor segment includes:
   a red phosphor segment configured to emit light of a red color wavelength within the second selected wavelength range and outside of the first selected wavelength range;
   a yellow phosphor segment configured to emit light of a yellow color wavelength within the second selected wavelength range and outside of the first selected wavelength range; and
   a green phosphor segment configured to emit light of a green color wavelength within the second selected wavelength range and outside of the first selected wavelength range.

6. The image projection system of claim 1, wherein the dichroic optical element includes a dichroic mirror positioned to reflect the laser light having the first and second wavelengths a first time from the source to the first rotable member and a second time from the light directing optics to the second rotable member.

7. The image projection system of claim 1, wherein the first and second light transmissive segments each includes a diffuse transmissive section.

8. The image projection system of claim 1, wherein the second rotable member is removably placed along a path between the dichroic optical element and a portion of the light output optics.

9. The image projection system of claim 1, further comprising:
   light collection optics positioned between the dichroic optical element and the second rotable member.

10. The image projection system of claim 1, wherein the light source includes:
    a first laser bank configured to generate the laser light of the first wavelength; and
    a second laser bank positioned orthogonally to the first laser bank, the second laser bank configured to generate the laser light of the second wavelength.

* * * * *